(12) United States Patent
Lambert et al.

(10) Patent No.: US 8,233,350 B2
(45) Date of Patent: Jul. 31, 2012

(54) FREQUENCY SHIFT RESERVOIR LOCALIZATION

(75) Inventors: Marc-André Lambert, Zürich (CH);
Erik Hans Saenger, Zürich (CH);
Stefan Schmalholz, Zürich (CH)

(73) Assignee: Spectraseis AG, Zürich (CH)

( * ) Notice: Subject to any disclaimer, the term of this patent is extended or adjusted under 35 U.S.C. 154(b) by 612 days.

(21) Appl. No.: 12/201,970

(22) Filed: Aug. 29, 2008

(65) Prior Publication Data

US 2009/0175126 A1 Jul. 9, 2009

Related U.S. Application Data

(60) Provisional application No. 60/968,811, filed on Aug. 29, 2007.

(51) Int. Cl.
*G01V 1/28* (2006.01)

(52) U.S. Cl. .............................. 367/49; 367/47; 702/14

(58) Field of Classification Search .................... 702/14, 702/16; 367/38, 47, 49
See application file for complete search history.

(56) References Cited

U.S. PATENT DOCUMENTS

| | | | |
|---|---|---|---|
| 3,689,874 A * | 9/1972 | Foster et al. | 367/46 |
| 6,131,071 A * | 10/2000 | Partyka et al. | 702/16 |
| 6,442,489 B1 * | 8/2002 | Gendelman et al. | 702/12 |
| 7,729,862 B2 * | 6/2010 | Dewarrat | 702/14 |

FOREIGN PATENT DOCUMENTS

| | | | |
|---|---|---|---|
| WO | WO 00/33107 | * | 6/2000 |
| WO | WO 2006/011826 | * | 2/2006 |

* cited by examiner

*Primary Examiner* — Ian Lobo

(57) ABSTRACT

A method and system of detecting and mapping a subsurface hydrocarbon reservoir includes acquiring seismic data having a plurality of components, applying a data transform to the seismic data to obtain seismic data spectral component maxima and maxima profiles, and recording the maxima or maxima profile in a form for display.

6 Claims, 14 Drawing Sheets

FREQUENCY SHIFT RESERVOIR LOCALIZATION

CROSS-REFERENCE TO RELATED APPLICATION

This application claims the benefit of U.S. Provisional Application No. 60/968,811 filed 29 Aug. 2007 and incorporated herein for all purposes.

BACKGROUND

1. Technical Field

The disclosure is related to seismic exploration for oil and gas, and more particularly to processing and displaying seismic data.

2. Description of the Related Art

Seismic exploration for hydrocarbons generally is conducted using a source of seismic energy and receiving and recording the energy generated by the source using seismic detectors. On land, the seismic energy source may be an explosive charge or another energy source having the capacity to impart impacts or mechanical vibrations at or near the earth's surface. Seismic waves generated by these sources travel into the earth subsurface and are reflected back from boundaries and reach the surface of the earth at varying intervals of time depending on the distance traveled and the characteristics of the subsurface material traversed. The return waves are detected by the sensors and representations of the seismic waves as representative electrical signals are recorded for processing.

Normally, signals from sensors located at varying distances from the source are combined together during processing to produce "stacked" seismic traces. In marine seismic surveys, the source of seismic energy is typically air guns. Marine seismic surveys typically employ a plurality of sources and/or a plurality of streamer cables, in which seismic sensors are mounted, to gather three dimensional data.

The process of exploring for and exploiting subsurface hydrocarbon reservoirs is often costly and inefficient because operators have imperfect information from geophysical and geological characteristics about reservoir locations. Furthermore, a reservoir's characteristics may change as it is produced.

Data acquisition for oil exploration may have a negative impact on the environment. The impact of oil exploration methods on the environment may be reduced by using low-impact methods and/or by narrowing the scope of methods requiring an active source, including reflection seismic and electromagnetic surveying methods.

Geophysical and geological methods are used to determine well locations. Expensive exploration investment is often focused in the most promising areas using relatively slow methods, such as reflection seismic data acquisition and processing. The acquired data are used for mapping potential hydrocarbon-bearing areas within a survey area to optimize exploratory well locations and to minimize costly non-productive wells.

The time from mineral discovery to production may be shortened if the total time required to evaluate and explore a survey area can be reduced by applying selected methods alone or in combination with other geophysical methods. Some methods may be used as a standalone decision tool for oil and gas development decisions when no other data is available. Preferable methods will be economical, have a low environmental impact, and relatively efficient with rapid data acquisition and processing.

Geophysical and geological methods are used to maximize production after reservoir discovery as well. Reservoirs are analyzed using time lapse surveys (i.e. repeat applications of geophysical methods over time) to understand reservoir changes during production.

SUMMARY

Figure 1A:
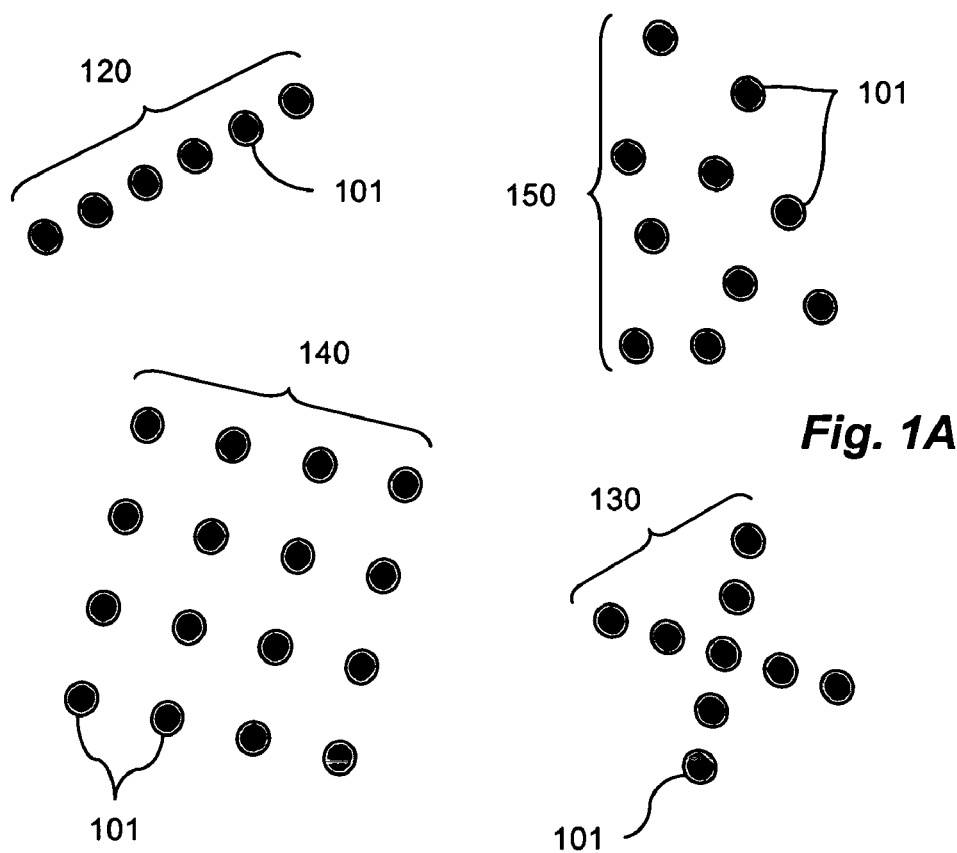
FIG. 1A illustrates various non-limiting possibilities for arrays of sensor for data acquisition of synchronous signals.

A method of locating subsurface hydrocarbon reservoirs or displaying hydrocarbon potential maps includes acquiring seismic data having a plurality of components, applying a data transform to the seismic data to obtain seismic data spectral component maxima and maxima profiles, and recording the maxima or maxima profile in a form for display.

DETAILED DESCRIPTION

Information to enable the direct detection of hydrocarbon reservoirs or forming hydrocarbon potential maps or displays may be extracted from naturally occurring seismic waves and vibrations measured at the earth's surface. These naturally occurring waves may be measured using passive seismic data acquisition methods to acquire naturally occurring background seismic data. The relative positions of frequency attributes are indicative of the surface expression of subsurface zones where hydrocarbons are present.

Low-impact survey methods like passive seismic data acquisition may be used for reconnaissance in frontier exploration areas, to monitor reservoirs over the productive life of a field or to cost-effectively upgrade data room information to generate higher license bids. Specific applications for passive seismic data include monitoring fluid flow, estimating shear-wave velocities, site zonation and shear-wave amplification studies for earthquake hazard surveys, monitoring hydraulic fracturing during reservoir stimulation and inversion for earth structure.

Passive seismic data acquisition methods rely on seismic energy from sources not directly associated with the data acquisition. In passive seismic monitoring there is no actively controlled and triggered source. Examples of low frequency ambient waves that may be recorded with passive seismic acquisition are microseisms (e.g., rhythmically and persistently recurring low-frequency earth tremors), microtremors and other anthropogenic or localized seismic energy sources.

Microtremors are attributed to the background energy present in the earth that may be due to non-seismic sources or anthropogenic noise. Microtremor seismic waves may include sustained seismic signals within a limited frequency range. Microtremor signals, like all seismic waves, contain information affecting spectral signature characteristics due to the media or environment that the seismic waves traverse. These naturally occurring relatively low frequency background seismic waves (sometimes termed noise or hum) of the earth may be generated from a variety of sources, some of which may be indeterminate.

Survey results from passive seismic surveying demonstrate that the spectral characteristics of microtremor seismic waves often contain relevant information for direct hydrocarbon detection. Direct hydrocarbon reservoir indicators may be extracted from naturally occurring low frequency background seismic data using spectral analysis of these microtremors. Spectral attributes or changes in spectral frequencies over geographic areas may be used to delineate subsurface hydrocarbon reservoirs. Microtremor analysis provides a method for identification and mapping of fluid reservoirs or reservoir related parameters directly from frequency attribute data acquired near the earth's surface in land and marine areas using naturally occurring seismic background waves. Collected over time these data highlight changes in reservoir parameters.

Frequency attribute analysis in the surface expression of seismic data allows for direct determination of a hydrocarbon reservoir independent of the subsurface reservoir structure. Additionally, the thickness of strata associated with a hydrocarbon reservoir may be determined or inferred from microtremor analysis and associated frequency attributes.

One or more sensors are used to measure vertical and horizontal components of motion due to background seismic waves at multiple locations within a survey area. These components may be measured separately or in combination and may be recorded as signals representing displacement, velocity, and/or acceleration.

As the spectral ratio of the acquired signal for any location may be quite stable over time, the components of motion may not need to be measured simultaneously. This may be especially applicable in areas with relatively low local ambient wave energy and for data acquired over relatively short time periods (e.g., a few weeks). Spectral ratios determined from asynchronous components at a location may be used as it is the relative difference of spectral components as opposed to specific contemporaneous differences that may be indicative of reservoir characteristics. However, due to anthropogenic or localized seismic energy generated in the vicinity of the seismic survey not related to subsurface reservoirs, relative quiescent periods free of this local anthropogenic seismic energy wherein orthogonal data components are substantially contemporaneously acquired may provide better quality data for delineating subsurface characteristics.

Geophysical survey local conditions may affect a method's results. In many cases the frequency attribute method described herein provides a reliable direct hydrocarbon indicator; in other cases a skilled operator can use the results to improve their interpretation of other geological and geophysical data and generate an improved subsurface model allowing for risk reduction and more efficient exploration and production decisions.

The sensor equipment for measuring seismic waves may be any type of seismometer. Seismometer equipment having a large dynamic range and enhanced sensitivity compared with other transducers may provide the best results (e.g., broadband multicomponent earthquake seismometers). A number of commercially available sensors utilizing different technologies may be used, e.g. a balanced force feed-back instrument or an electrochemical sensor. An instrument with high sensitivity at very low frequencies and good coupling with the earth enhances the efficacy of the method.

Ambient noise conditions representative of seismic wave energy that may have not traversed subsurface reservoirs can negatively affect the recorded data. Techniques for removing unwanted artifacts and artificial signals from the data, such as cultural and industrial noise, are important for applying this method successfully in areas where there is high ambient noise that has not interacted with a subsurface hydrocarbon reservoir.

The frequency shift attribute method for reservoir localization has several advantages over conventional seismic data acquisition for exploration including that the technique does not require an artificial seismic source, such as an explosion, mechanically generated vibration or electric current. Additionally, the results from spectral analysis are repeatable and the results may be correlated to hydrocarbon accumulations. There is little or no environmental impact due to data acquisition. The method is applicable for land, transition zones and marine areas. The method has application in areas where higher frequencies are greatly affected by geological conditions, e.g. in areas where soft soil layers attenuate high-frequency seismic signals as well as areas where salt formations or volcanic bodies (e.g. basalt flows, volcanic sills) scatter or obscure higher frequencies.

Data are acquired with arrays, which may be 2D or 3D, or even arbitrarily positioned sensors 101 as illustrated in FIG. 1A. FIG. 1A illustrates various acquisition geometries which may be selected based on operational considerations. Array 120 is a 2D array and while illustrated with regularly spaced sensors 101, regular distribution is not a requirement. Array 130 and 140 are example illustrations of 3D arrays. Sensor distribution 150 could be considered an array of arbitrarily placed sensors and may even provide for some modification of possible spatial aliasing that can occur with regular spaced sensor 101 acquisition arrays.

While data may be acquired with multi-component earthquake seismometer equipment with large dynamic range and enhanced sensitivity (relative to 'conventional' equipment), many different types of sensor instruments can be used with different underlying technologies and varying sensitivities. Sensor positioning during recording may vary, e.g. sensors may be positioned on the ground, below the surface or in a borehole. The sensor may be positioned on a tripod or rockpad. Sensors may be enclosed in a protective housing for ocean bottom placement. Wherever sensors are positioned, good coupling results in better data. Recording time may vary, e.g. from minutes to hours or days. In general terms, longer-term measurements may be helpful in areas where there is high ambient noise and provide extended periods of data with fewer noise problems.

The layout of a data survey may be varied, e.g. measurement locations may be close together or spaced widely apart and different locations may be occupied for acquiring measurements consecutively or simultaneously. Simultaneous recording of a plurality of locations (a sensor array) may provide for relative consistency in environmental conditions that may be helpful in ameliorating problematic or localized ambient noise not related to subsurface characteristics of interest. Additionally the array may provide signal differentiation advantages due to commonalities and differences in the recorded signal.

Figure 1B:
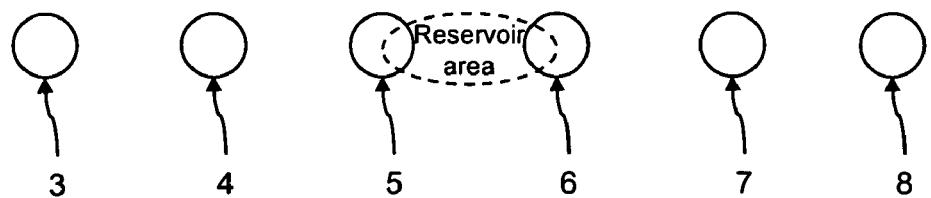
FIG. 1B illustrates a linear array of sensors relative to subsurface reservoir.

FIG. 1B illustrates a layout of relative sensor positions with arbitrary labels. As illustrated it shows the sensors positioned in an exemplary manner relative to an arbitrary reservoir location.

Figure 2:
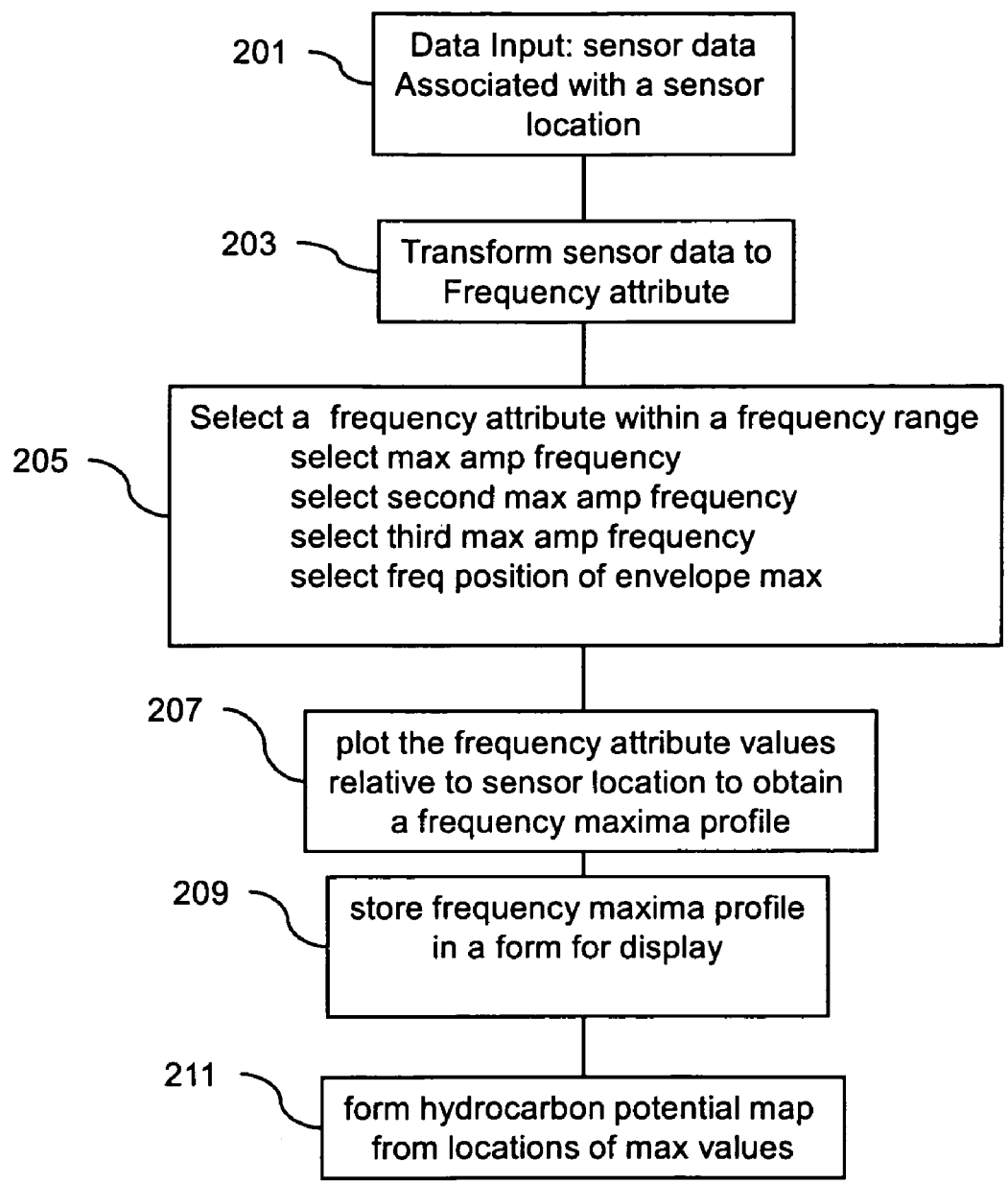
FIG. 2 is a schematic illustration of a method according to an embodiment of the present disclosure for localizing a reservoir in a survey area or forming a hydrocarbon potential map from frequency attributes or frequency attribute relationships.

FIG. 2 illustrates an embodiment, which may include acquiring multicomponent sensor data wherein one or more of the acquired components may be used (in any order), for determining hydrocarbon accumulations in a subsurface reservoir. Seismic data that that may have a plurality of components 201 are obtained. The data may include a time stamp vector and orthogonal data vectors. The data vectors may be all same length and synchronized. The components may be orthogonal vector data representing two horizontal directions and a vertical direction. A data transform 203 is performed to obtain data representations as frequency attributes. A frequency attribute within a selected frequency range is selected for comparison with frequency attributes from data acquired for various positions over a survey area. For illustration in this disclosure, the frequency attributes are referenced with respect to the two-dimensional layout of FIG. 1B, though any arbitrary layout, such as are shown in FIG. 1A may be used.

The selected frequency attributes 205 for comparison may be maximum amplitude, the second maximum amplitude over a range (subordinate in value to the maximum), a third maximum (subordinate in value to the maximum and the second maximum), the third maximum value or the envelope maximum over the selected range.

These values are compared or plotted to determine the geographical location where the values are a maximum 207. This maximum is indicative of where subsurface hydrocarbons are most likely to be found, hence a hydrocarbon potential map may be developed from these values. The frequency attribute values may be stored in a form for display 209. A hydrocarbon potential map 211 may be formed by a display of the any of the selected values or the relative relationships of the various first, second, third and any subsequently determined maxima.

Figure 3:
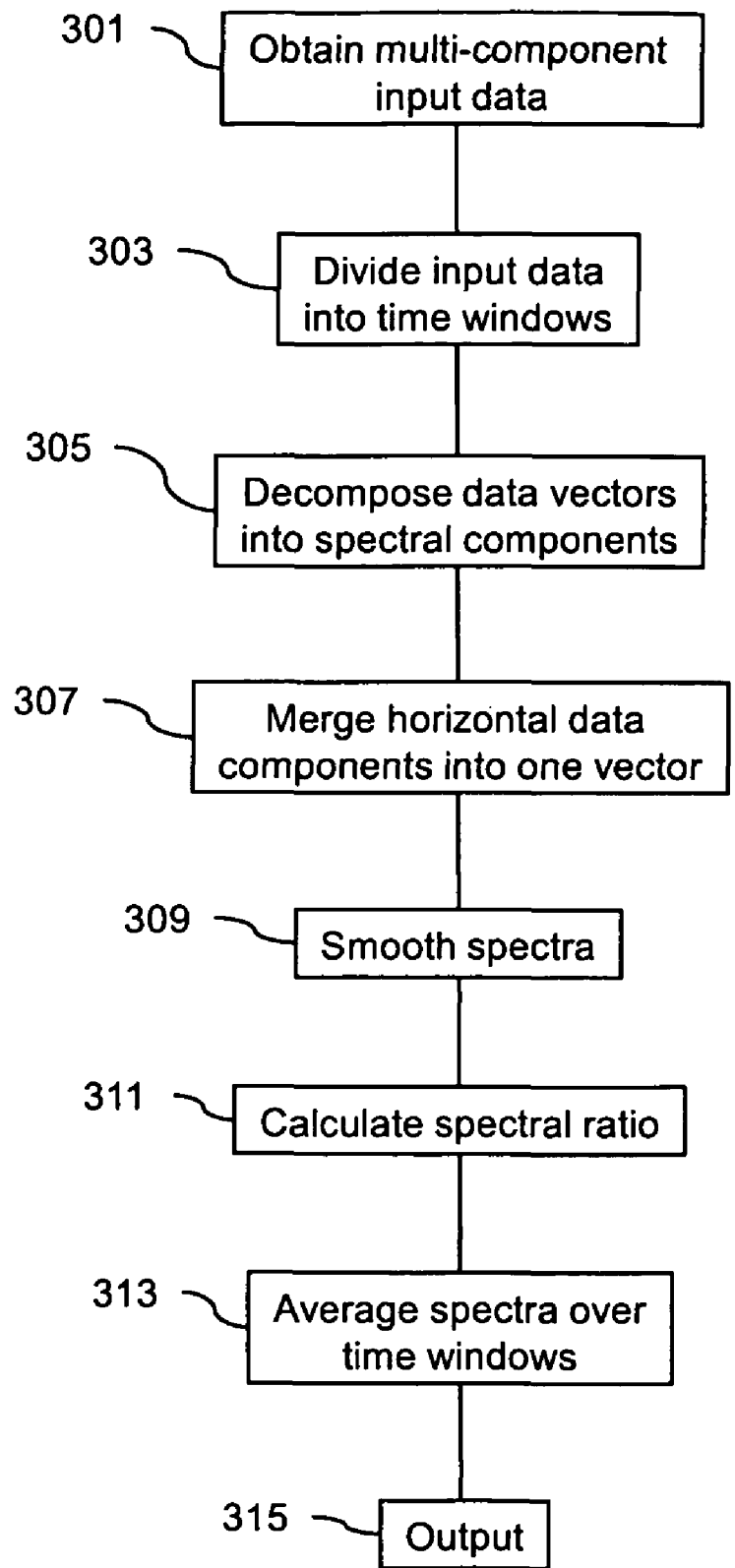
FIG. 3 illustrates a method according to an embodiment of the present disclosure.

FIG. 3 is a schematic illustration of a method of processing passively acquired naturally occurring background seismic data to determine a seismic data attribute, for example a V/H spectral ratio, related to direct indications of hydrocarbons. The embodiment, which may include one or more of the following referenced components (in any order), is a method of locating subsurface anomalies related to hydrocarbon accumulations that includes obtaining seismic data having a plurality of components 301. The acquired data may be time stamped and include multiple data vectors. An example is multicomponent earthquake type seismometry data, which includes recordings of low-frequency seismic background waves as differentiated from localized or anthropogenic energy related seismicity. The multiple data vectors may each be associated with an orthogonal direction of movement. Data may be acquired in, or mathematically rotated into, orthogonal component vectors arbitrarily designated east, north and depth (respectively, Ve, Vn and Vz) or designated $V_x$, $V_y$ and $V_z$ according to desired convention. The data vectors may all be the same length and synchronized.

The vector data may be divided into time windows 303 for processing. Window lengths may be greater than ten times the period of the lowest frequency of interest. For example if a frequency of interest has a period around 7 seconds all the windows may be at least 70 seconds long. However, the length of time windows for analysis may be chosen to accommodate processing or operational concerns.

A data transform may be applied to each component of the vector data 305. Seismic data frequency content often varies with time. Time-frequency decomposition (spectral decomposition) of a seismic signal enables analysis and characterization of the signal time-dependent frequency response due to subsurface materials and reservoir parameters.

Various data transformations are useful for time-frequency analysis of seismic signals, such as continuous or discrete Fourier or wavelet transforms. Examples include without limitation the classic Fourier transform or one of the many continuous Wavelet transforms (CWT) or discreet wavelet transforms. Examples of other transforms include Haar transforms, Haademard transforms and wavelet transforms. The Morlet wavelet is an example of a wavelet transform that may be applied to seismic data. Wavelet transforms have the attractive property that the corresponding expansion may be differentiable term by term when the seismic trace is smooth. Additionally, signal analysis, filtering, and suppressing unwanted signal artifacts may be carried out efficiently using transforms applied to the acquired data signals.

One or more orthogonal components of the acquired data may be merged, for example the horizontal data components 307. Horizontal components Ve and Vn may be merged by any of several ways including a root-mean-square average so that horizontal component H may be defined as H= $\sqrt{(V_e^2+V_n^2)/2}$. Whether merging data components is undertaken before or after a data transform is applied to the data is a matter of choice.

Additionally the spectra may be smoothed using a moving average 309. The smoothing parameter defines the width of the window (in Hz) used for calculating moving averages. A large smoothing parameter leads to strong smoothing and a small smoothing parameter leads to less smoothing. Typical values may be between 0.1 Hz and 2 Hz, but will be case dependent. A smoothing parameter for a flow may be selected at the beginning of a processing flow for application prior to calculating a spectral ratio.

The V/H spectral ratio is calculated 311 based on the spectral division (e.g., point-by-point spectral division) between the transformed output of at least two orthogonal components, such as a horizontal spectral component and the vertical spectral component. The horizontal component may be a combination of the measured horizontal components (as in 307). These spectra or the calculated spectral ratios may be averaged over time windows 313. Averaging over time windows may be by arithmetic mean or geometric mean. Averaging of spectra may be undertaken before or after dividing the spectra into spectral ratios. The results after this processing may be output 315 in a form for mapping or other display. Maps of these results using relative spectral amplitude maxima may provide direct indications of the geographical extent of hydrocarbon reservoirs in the field survey vicinity as outlined in FIG. 2.

Figure 4:
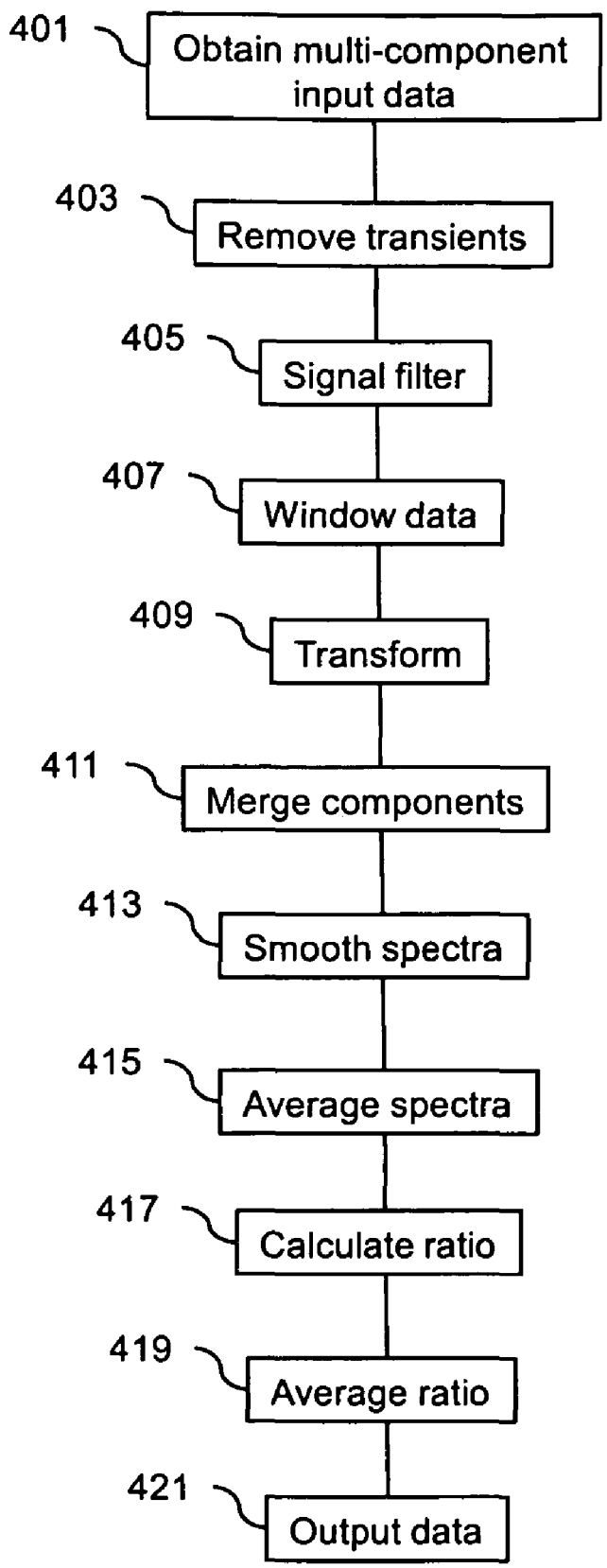
FIG. 4 illustrates a method according to an embodiment of the present disclosure.

FIG. 4 illustrates a data processing work flow, which may include one or more of the referenced components (in any order), for determining hydrocarbon accumulations in a subsurface reservoir. Seismic data that has a plurality of components 401 are obtained. The data may include a time stamp vector and orthogonal data vectors. The data vectors may be all same length and synchronized. The components may be orthogonal vector data representing two horizontal directions and a vertical direction.

The multicomponent input data may be cleaned to remove transients 403. One way to remove transients is to process data when transients are not present. Signal filtering 405 with the time domain data include frequency filtering and bias removal. The data may be detrended so that one or more linear trends are removed. The data may be band pass filtered or a DC offset bias removed as well.

The data may be divided into time windows 407. The time window length for data vectors may be chosen based on operational or processing considerations, and an example length may correspond to 10 cycles of the lower frequency range of interest. Horizontal data components may be merged, for example by averaging or by a root-mean-square weighting of the values.

Data may be rotated to any desired reference frame. A reference frame where the vertical vector direction is normal to the geoid may be beneficial for subsequent formation of attributes. The spectra may be smoothed, for example with a moving average function. The data may be decomposed into spectral components 409 by any time-frequency decomposition, e.g., Fourier or Wavelet transform.

One or more orthogonal components of the obtained data may be merged 411, for example the horizontal data components (e.g., 307). Horizontal components Ve and Vn may be merged by any of several ways including a geometrical means like the root-mean-square average so that horizontal component H may be defined as $H=\sqrt{(V_e^2+V_n^2)/2}$. Other methods for merging including using an arithmetic mean, a Pythagorean mean or a complex Fourier transformation.

The spectra may be smoothed 413 using a low pass filter, a moving window with a fixed bandwidth or a variable bandwidth. The spectra may be averaged 415 using an arithmetic mean or a geometric mean.

A spectral ratio is determined between transformed components 417. The spectral ratio may be determined with point-by-point spectral division, for example determining spectral ratios between horizontal and vertical data. A V/H spectral ratio may be determined using the vertical component with one or both horizontal components, or a merged version of the horizontal components. The spectral ratio may be averaged 419 as well, using an arithmetic or geometric mean. The calculated ratio may be stored 421 (to a computer readable media) in a form for display and/or formed into a map. A map created with the calculated ratio may give a direct indication of the geographical extent of subsurface hydrocarbon reservoirs.

While data may be acquired with multi-component earthquake seismometer equipment with large dynamic range and enhanced sensitivity, many different types of sensor instruments can be used with different underlying technologies and varying sensitivities. Sensor positioning during recording may vary, e.g. sensors may be positioned on the ground, below the surface or in a borehole. The sensor may be positioned on a tripod or rock pad. Sensors may be enclosed in a protective housing for ocean bottom placement. Wherever sensors are positioned, good coupling results in better data. Recording time may vary, e.g. from minutes to hours or days. In general terms, longer-term measurements may be helpful in areas where there is high ambient noise (representative of wave energy not traversing a subsurface hydrocarbon reservoir) and provide extended periods of data with fewer noise problems.

The layout of a survey may be varied, e.g. measurement locations may be close together or spaced widely apart and different locations may be occupied for acquiring measurements consecutively or simultaneously. Simultaneous recording of a plurality of locations may provide for relative consistency in environmental conditions that may be helpful in ameliorating problematic or localized ambient noise not related to subsurface characteristics.

Figure 5:
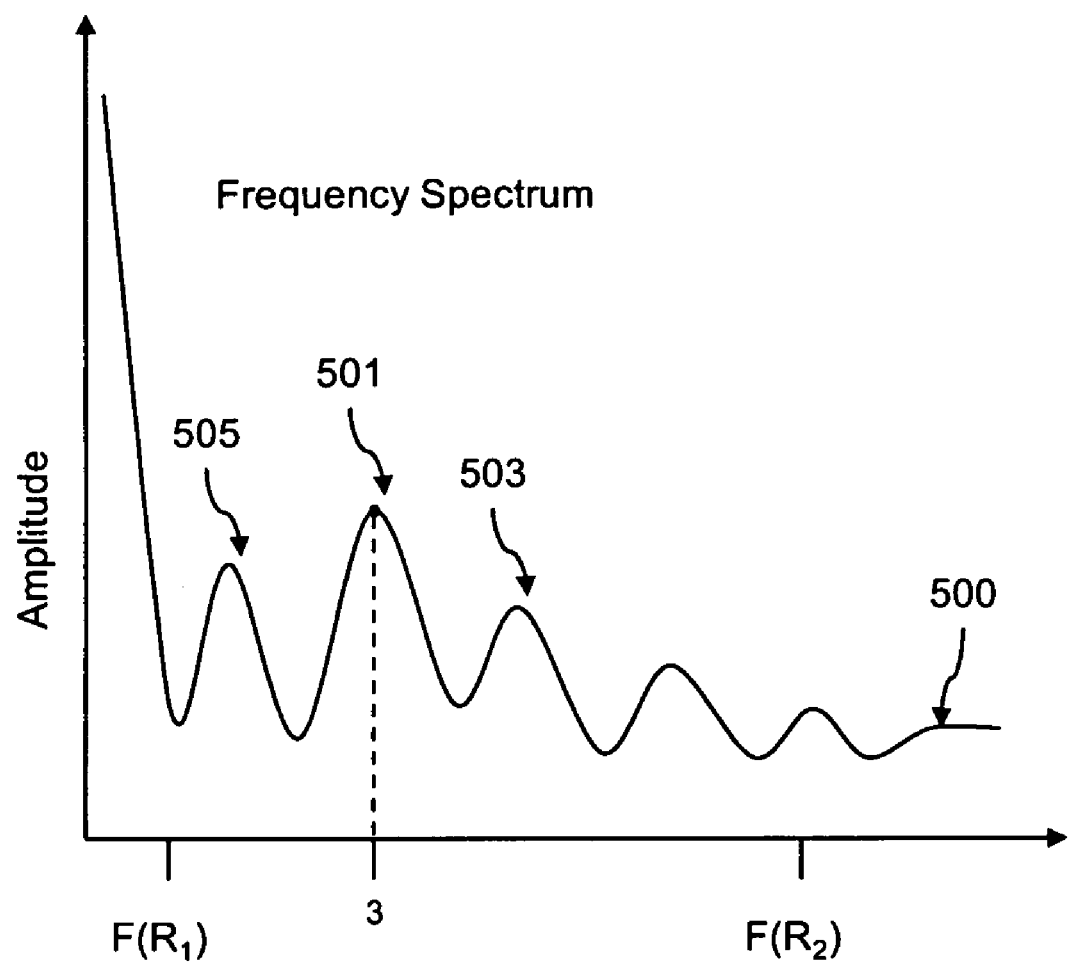
FIGS. 5, 6 and 7 illustrates an example of a frequency spectrum of transformed data wherein the maximum value is found proximate to other peak maxima.
Figure 6:
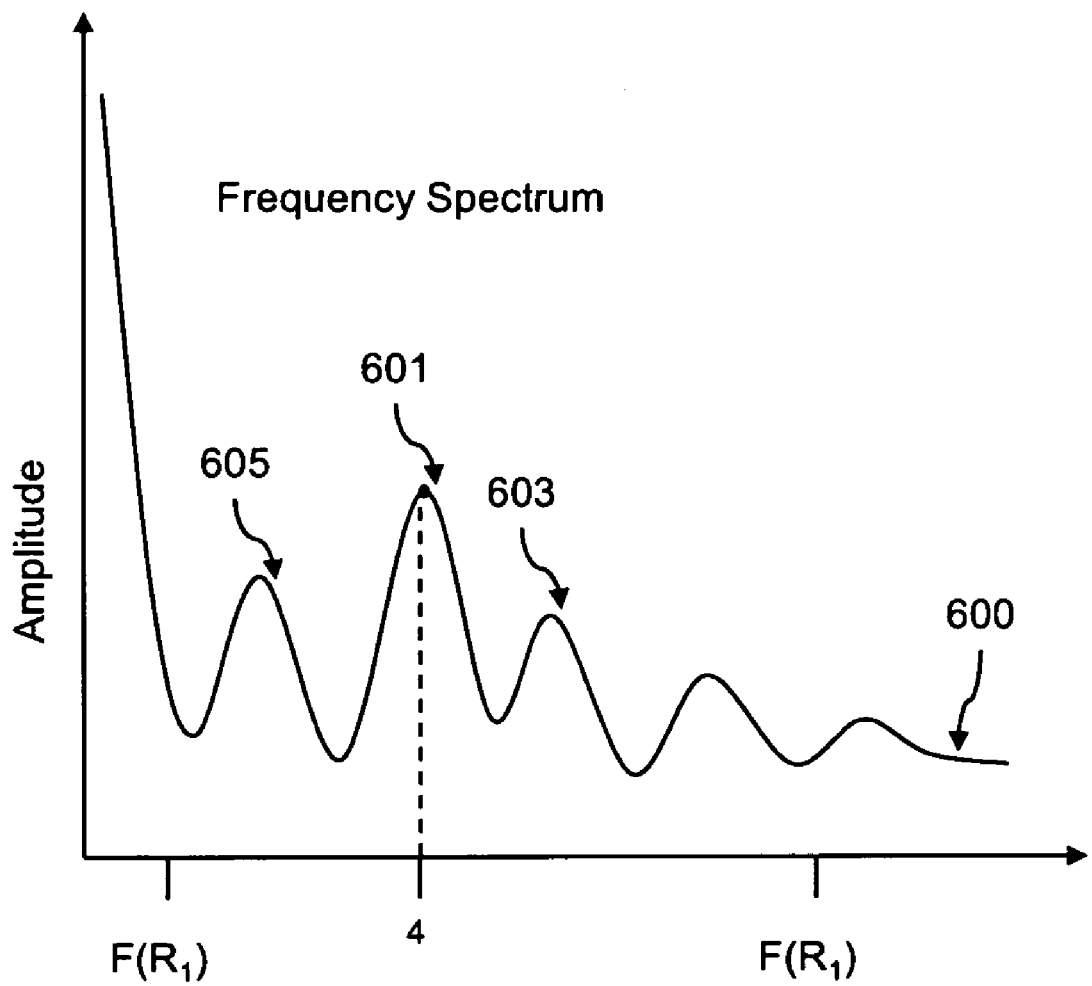
Figure 7:
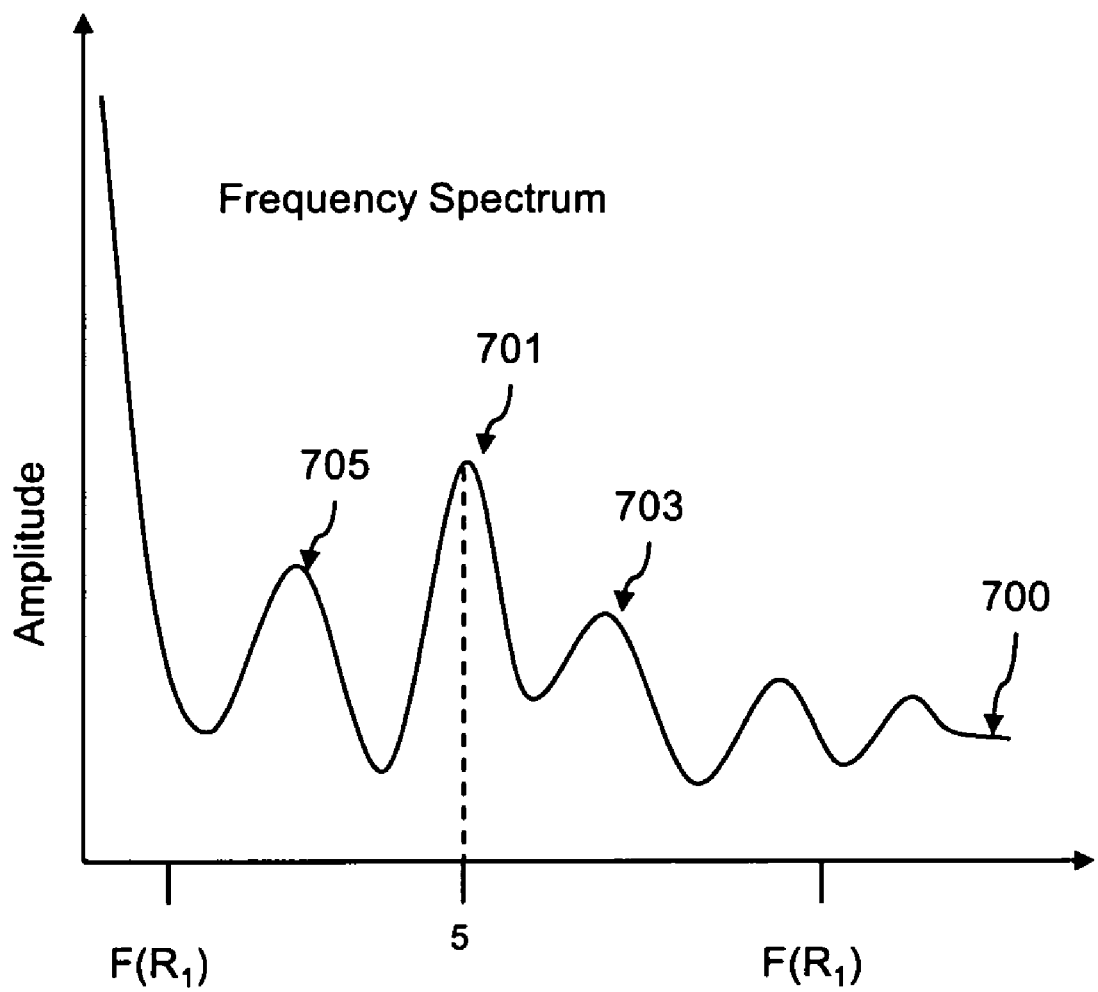
Figure 8:
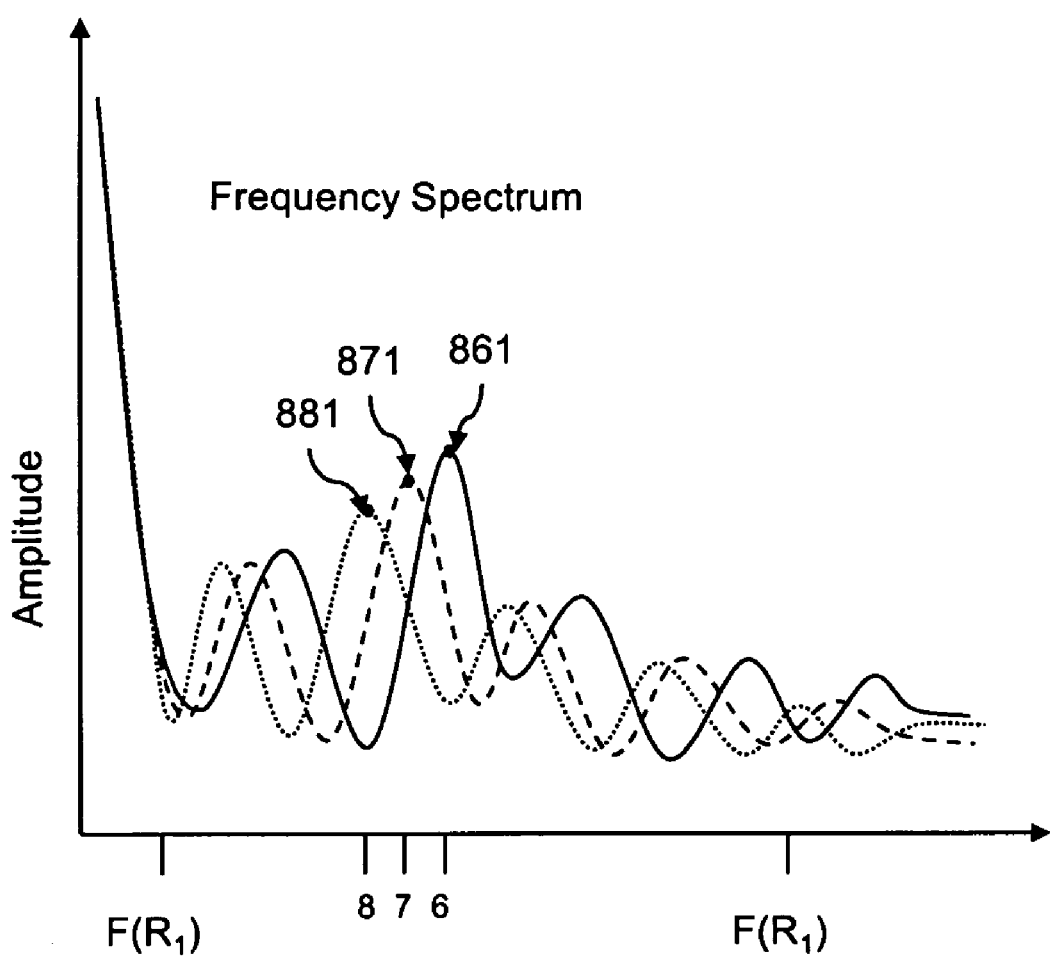
FIG. 8 illustrates an example over an arbitrary frequency range of stations similar to 3, 4 and 5 of respective FIG. 5, FIG. 6 and FIG. 7 illustrating one maximum relative to other or adjacent sensor stations.

FIG. 5 illustrates an example of a frequency spectrum of transformed data 500 wherein the maximum value is found proximate to the peak 501, the second maximum 505 and the third maximum 503. As illustrated, a range is selected from $F(R_1)$ to $F(R_2)$. FIG. 6 illustrates an example of a frequency spectrum of transformed data 600 wherein the maximum value is found proximate to the peak 601, the second maximum 605 and the third maximum 603. As illustrated, a range is selected from $F(R_1)$ to $F(R_2)$. FIG. 7 illustrates an example of a frequency spectrum of transformed data 700 wherein the maximum value is found proximate to the peak 701, the second maximum 705 and the third maximum 703. As illustrated, a range is selected from $F(R_1)$ to $F(R_2)$. FIG. 8 illustrates an example over range $F(R_1)$ to $F(R_2)$ of stations similar to 3, 4 and 5 of respective FIG. 5, FIG. 6 and FIG. 7 wherein the maximum for position 6 is the peak 861, the maximum of for position 7 is 871 and the maximum for position 8 is 881.

Figure 9:
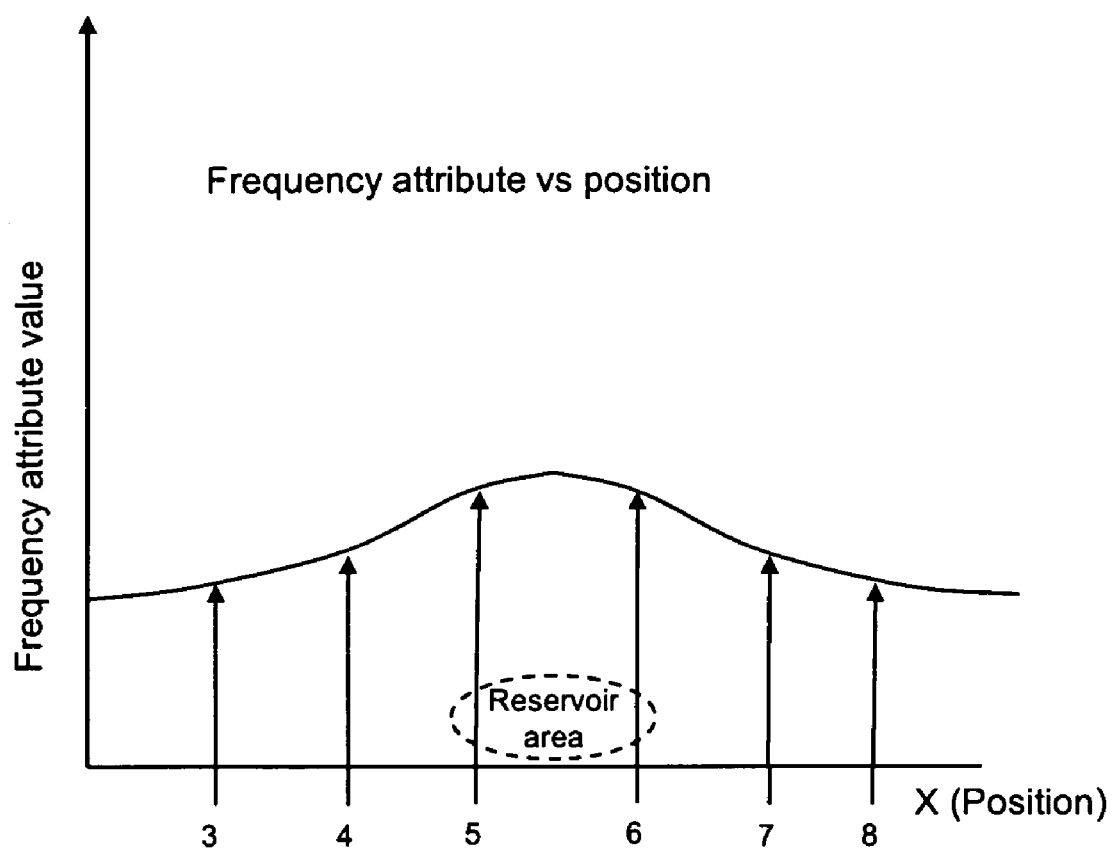
FIG. 9 schematically illustrates where a hydrocarbon reservoir may be located based on the relative strengths of a frequency attribute comparison over a selected range as illustrated above. An example in the frequency maximum amplitude here plotted at each sensor station.

FIG. 9 schematically illustrates where a hydrocarbon reservoir may be spatially located (for example by field position 'X') based on the relative strengths of a (maximum) frequency attribute comparison over a selected range as illustrated above. A hydrocarbon potential may be mapped or displayed relative to stations 5 and 6 of the stations schematically illustrated herein. In the field positions where the relative values of the computed frequency attributes is strongest, a subsurface reservoir location is more likely.

Figure 10:
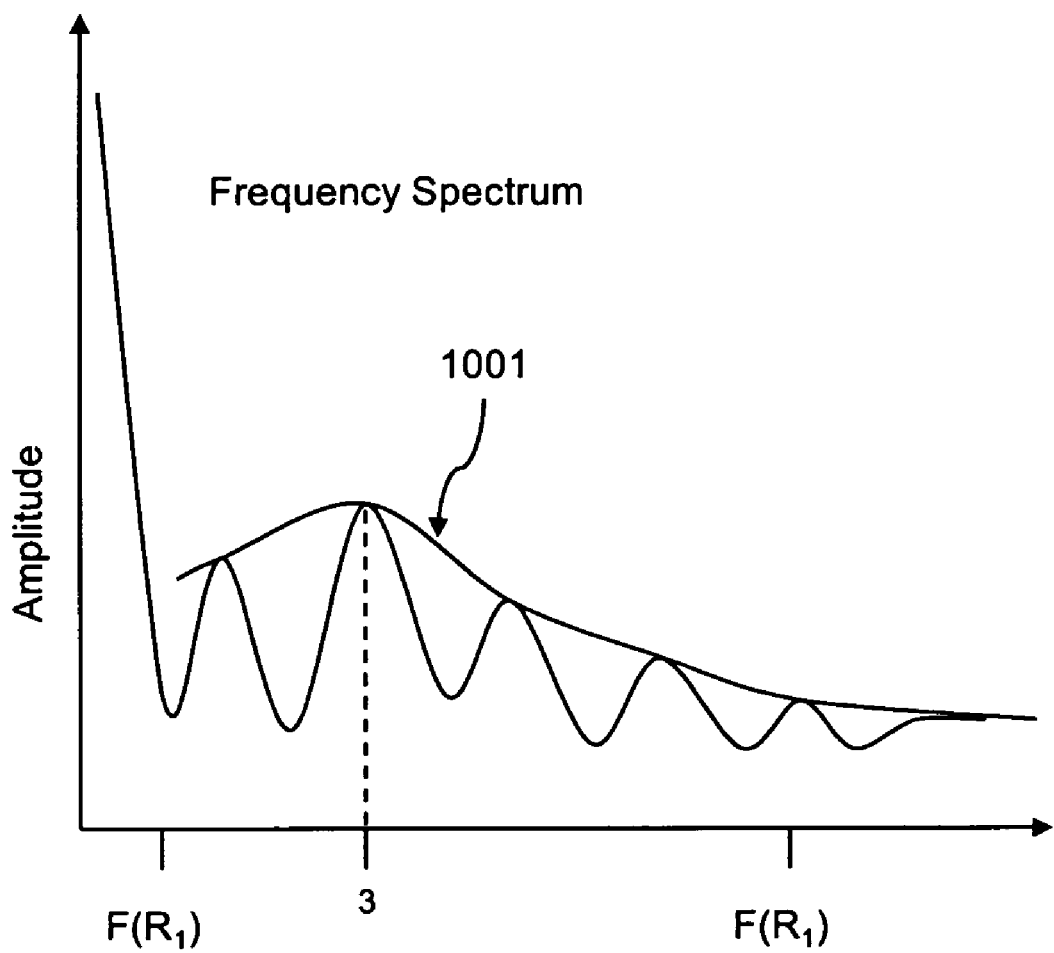
FIG. 10 illustrates an envelope maximum in the neighborhood of station 3 similar to FIG. 5.
Figure 11:
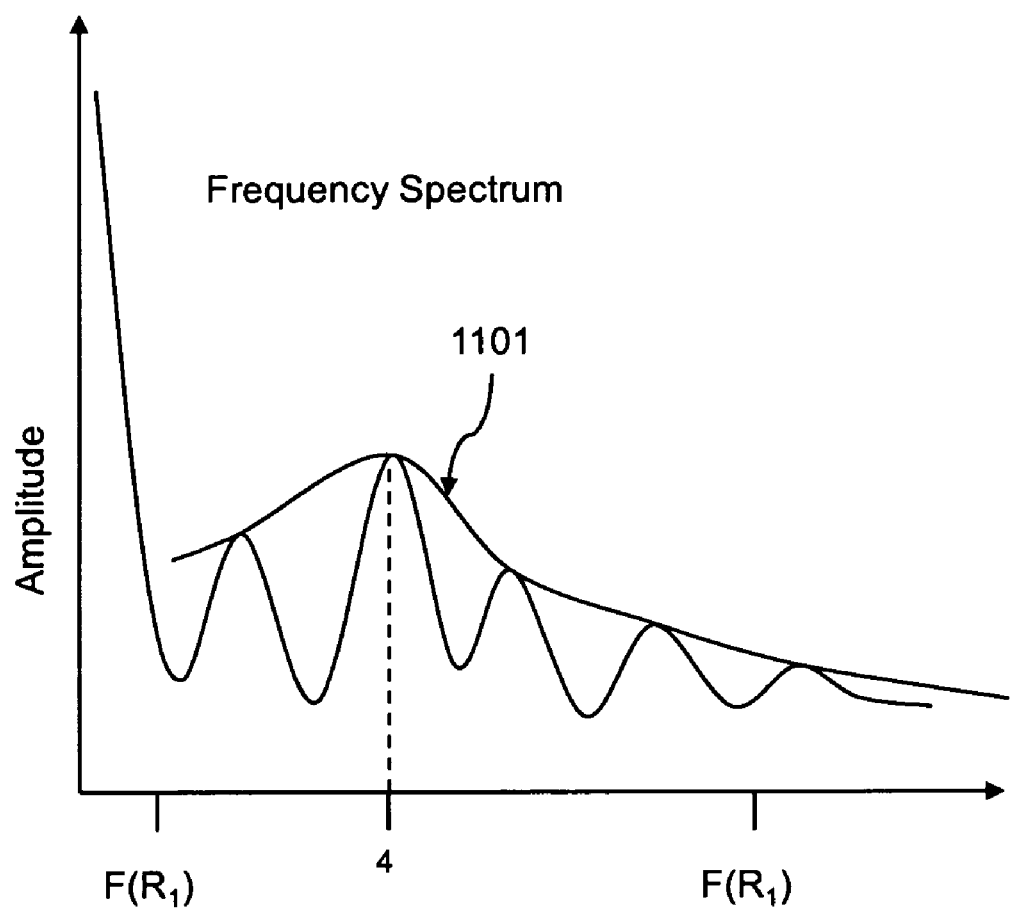
FIG. 11 illustrates an envelope maximum in the neighborhood of station 4 similar to FIG. 6.
Figure 12:
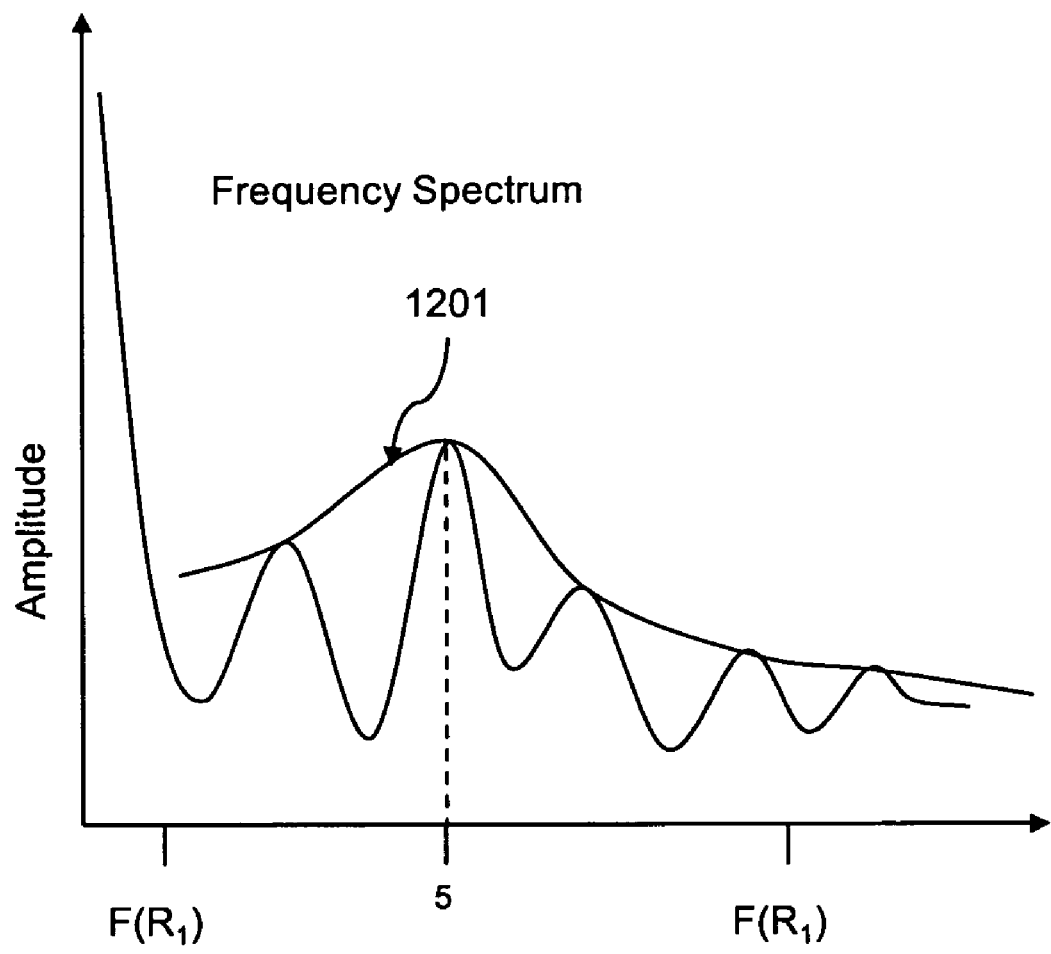
FIG. 12 illustrates an envelope maximum in the neighborhood of station 5 similar to FIG. 7.

FIGS. 10, 11 and 12 illustrate an embodiment using envelopes of the frequency spectrum for reservoir position determination. FIG. 10 illustrates an envelope 1001 in the neighborhood of station 3 similar to FIG. 5. FIG. 11 illustrates an envelope 1101 in the neighborhood of station 4 similar to FIG. 6. FIG. 12 illustrates an envelope 1201 in the neighborhood of station 5 similar to FIG. 7. The frequency attributes used for comparison and display for an illustration similar to FIG. 9 may be developed using the maximum of the frequency envelope and plotted in manner similar to the data examples of the FIGS. 5 through 9.

Figure 13:
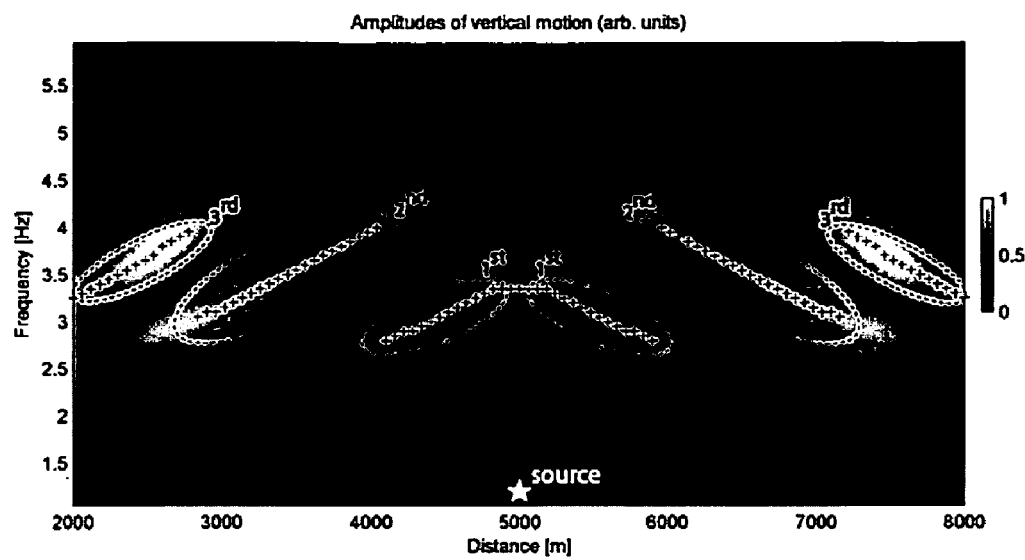
FIG. 13 illustrates numerical results for a low-frequency source at 2000 m depth in the center of the model domain. The normalized spectral amplitudes of the vertical component of the synthetic wave field at the free surface are plotted versus distance and frequency.

FIG. 13 illustrates the spatial spectrogram (amplitude versus distance versus frequency) of the vertical component of the synthetic wave field recorded at the free surface. Vertical component values, in Hz, are plotted as black crosses. They lie around 3 Hz directly above the source (x=5000 m) and decrease to lower frequencies with increasing distance from the source. This characteristic is highlighted with two ellipses, labeled as $1^{st}$, and forms a positive anomaly in the vertical component data. At greater distances, symmetric branches at higher frequencies become dominant (ellipses labeled as $2^{nd}$ and $3^{rd}$). Such a frequency pattern is mainly controlled by the lateral change of the travel-time difference between P- and S-wave arrivals. The wavelets of the emitted P- and S-waves have a similar shape and therefore appear like multiples in the modeled time signal. Multiple wavelets manifest themselves in the amplitude spectrum as periodic peaks and notches. The greater the wavelet separation in time (i.e., the greater the distance from the source), the closer the peaks and notches in the amplitude spectrum. This behavior can be observed in the spectrograms of FIG. 13 and leads to the characteristic peak frequency anomaly above the source. Therefore, such an anomaly can only be generated by a source with a preferred directionality (emitting P- and S-waves). For example, an isotropic P-wave source (explosion) does not show such a pattern.

Figure 14:
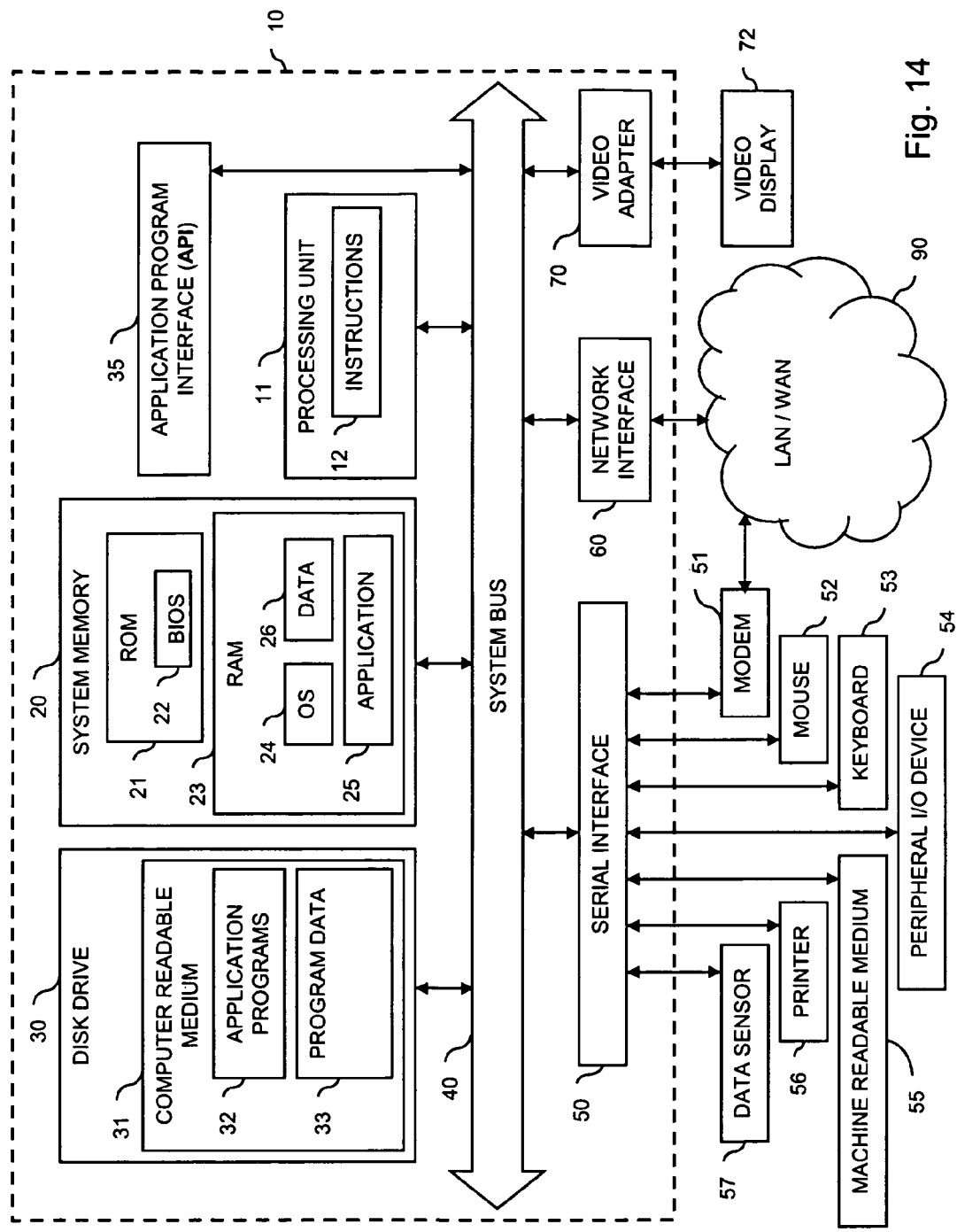
FIG. 14 is diagrammatic representation of a machine in the form of a computer system within which a set of instructions, when executed may cause the machine to perform any one or more of the methods and processes described herein.

FIG. 14 illustrates a schematic example of the hardware and operating environment for which embodiments as described herein and their equivalents may be practiced. The description of FIG. 14 includes a general description of computer hardware, computing environment or information handling system for which the embodiments may be implemented. Although specific hardware may not be required, embodiments may be implemented in the general context of computer-executable instructions, such as program modules, being executed by a computer. Various embodiments may be practiced with a personal computer, a mainframe computer or combinations that include workstations with servers. Program modules include routines, programs, objects, components and data structures for performing tasks, processing data, and recording and displaying information.

The products as defined herein may be particularly adapted for use in what are termed "information handling system." An information handling system is any instrumentality or aggregate of instrumentalities primarily designed to compute, classify, process, transmit, receive, retrieve, originate, switch, store, display, manifest, measure, detect, record, reproduce, handle or utilize any form of information, intelligence or data for business, scientific, control or other purposes. Examples include personal computers and larger processors such as servers, mainframes, etc, and may contain elements illustrated in FIG. 14.

Embodiments may be practiced with various computer or information handling system configurations that separately or in combination may include hand-held devices, multiprocessor systems, microprocessor-based or programmable consumer electronics, network computers, minicomputers, mainframe computers, and the like. Embodiments may be practiced with tasks performed in and over distributed computing environments that include remote processing devices linked through a communications network. Program modules operating in distributed computing environments may be located in various memory locations, both local and remote.

FIG. 14 is illustrative of hardware and an operating environment for implementing a general purpose computing device or information handling system in the form of a computer 10. Computer 10 includes a processor or processing unit 11 that may include 'onboard' instructions 12. Computer 10 has a system memory 20 attached to a system bus 40 that operatively couples various system components including system memory 20 to processing unit 11. The system bus 40 may be any of several types of bus structures using any of a variety of bus architectures as are known in the art.

While one processing unit 11 is illustrated in FIG. 14, there may be a single central-processing unit (CPU) or a graphics processing unit (GPU), or both or a plurality of processing units. Computer 10 may be a standalone computer, a distributed computer, or any other type of computer.

System memory 20 includes read only memory (ROM) 21 with a basic input/output system (BIOS) 22 containing the basic routines that help to transfer information between elements within the computer 10, such as during start-up. System memory 20 of computer 10 further includes random access memory (RAM) 23 that may include an operating system (OS) 24, an application program 25 and data 26.

Computer 10 may include a disk drive 30 to enable reading from and writing to an associated computer or machine readable medium 31. Computer readable media 31 includes application programs 32 and program data 33.

For example, computer readable medium 31 may include programs to process seismic data, which may be stored as program data 33, according to the methods disclosed herein. The application program 32 associated with the computer readable medium 31 includes at least one application interface for receiving and/or processing program data 33. The program data 33 may include seismic data acquired according to embodiments disclosed herein. At least one application interface may be associated with calculating a ratio of data components, which may be spectral components, for locating subsurface hydrocarbon reservoirs.

The disk drive may be a hard disk drive for a hard drive (e.g., magnetic disk) or a drive for a magnetic disk drive for reading from or writing to a removable magnetic media, or an optical disk drive for reading from or writing to a removable optical disk such as a CD ROM, DVD or other optical media.

Disk drive 30, whether a hard disk drive, magnetic disk drive or optical disk drive is connected to the system bus 40 by a disk drive interface (not shown). The drive 30 and associated computer-readable media 31 enable nonvolatile storage and retrieval for one or more application programs 32 and data 33 that include computer-readable instructions, data structures, program modules and other data for the computer 10. Any type of computer-readable media that can store data accessible by a computer, including but not limited to cassettes, flash memory, digital video disks in all formats, random access memories (RAMs), read only memories (ROMs), may be used in a computer 10 operating environment.

The application programs 32 may be associated with one or more application program interfaces. An application programming interface (API) 35 may be an interface that a computer system, library or application provides in order to allow requests for services to be made of it by other computer programs, and/or to allow data to be exchanged between them. An API 35 may also be a formalized set of software calls and routines that can be referenced by an application program 32 in order to access supporting application programs or services, which programs may be accessed over a network 90.

APIs 35 are provided that allow for higher level programming for displaying and mapping subsurface reservoirs. For example, APIs are provided for receiving seismic data, and decomposing, merging, smoothing and averaging the data. Moreover, the APIs allow for receiving the frequency product data and storing it for display.

Data input and output devices may be connected to the processing unit 11 through a serial interface 50 that is coupled to the system bus. Serial interface 50 may a universal serial bus (USB). A user may enter commands or data into computer 10 through input devices connected to serial interface 50 such as a keyboard 53 and pointing device (mouse) 52. Other peripheral input/output devices 54 may include without limitation a microphone, joystick, game pad, satellite dish, scanner or fax, speakers, wireless transducer, etc. Other interfaces (not shown) that may be connected to bus 40 to enable input/output to computer 10 include a parallel port or a game port. Computers often include other peripheral input/output devices 54 that may be connected with serial interface 50 such as a machine readable media 55 (e.g., a memory stick), a printer 56 and a data sensor 57. A seismic sensor or seismometer for practicing embodiments disclosed herein are nonlimiting examples of data sensor 57. A video display 72 (e.g., a liquid crystal display (LCD), a flat panel, a solid state display, or a cathode ray tube (CRT)) or other type of output display device may also be connected to the system bus 40 via an interface, such as a video adapter 70. A map display created from spectral ratio values as disclosed herein may be displayed with video display 72.

A computer 10 may operate in a networked environment using logical connections to one or more remote computers. These logical connections are achieved by a communication device associated with computer 10. A remote computer may be another computer, a server, a router, a network computer, a workstation, a client, a peer device or other common network node, and typically includes many or all of the elements described relative to computer 10. The logical connections depicted in FIG. 3 include a local-area network (LAN) or a wide-area network (WAN) 90. However, the designation of such networking environments, whether LAN or WAN, is often arbitrary as the functionalities may be substantially similar. These networks are common in offices, enterprise-wide computer networks, intranets and the Internet.

When used in a networking environment, the computer 10 may be connected to a network 90 through a network interface or adapter 60. Alternatively computer 10 may include a modem 51 or any other type of communications device for establishing communications over the network 90, such as the Internet. Modem 51, which may be internal or external, may be connected to the system bus 40 via the serial interface 50.

In a networked deployment computer 10 may operate in the capacity of a server or a client user machine in server-client user network environment, or as a peer machine in a peer-to-peer (or distributed) network environment. In a networked environment, program modules associated with computer 10, or portions thereof, may be stored in a remote memory storage device. The network connections schematically illustrated are for example only and other communications devices for establishing a communications link between computers may be used.

While various embodiments have been shown and described, various modifications and substitutions may be made thereto without departing from the spirit and scope of the disclosure herein. Accordingly, it is to be understood that the present embodiments have been described by way of illustration and not limitation.

The invention claimed is:

1. A method of processing seismic data comprising:
   decomposing, using a processing unit, seismic data from a survey area to obtain spectral component seismic data over a selected frequency range;
   selecting, using a processing unit, local first frequency attribute amplitude maxima of the spectral component seismic data over the selected frequency range for a plurality of sensor positions over a survey area;
   obtaining, using a processing unit, a frequency maxima profile from the local first frequency attribute amplitude maxima over the survey area;
   selecting, using a processing unit, second frequency attribute amplitude maxima over the selected frequency range;
   obtaining, using a processing unit, a frequency maxima profile from the second frequency attribute amplitude maxima over the survey area; and
   locating, using a processing unit, a subsurface hydrocarbon reservoir based on the relative strengths of the frequency attribute amplitude maxima over the survey area.

2. The method of claim 1 further comprising selecting a third amplitude maxima over the selected frequency range and obtaining a frequency maxima profile from the third amplitude maxima over the survey area.

3. The method of claims 1 or 2 further comprising locating a subsurface hydrocarbon reservoir based on the relative strengths of a maxima envelope of the first, second and third frequency maxima over the selected frequency range.

4. The method of claim 1 further comprising displaying the local amplitude maxima as a map over the survey area.

5. The method of claim 1 wherein the spectral component is obtained by: applying a data transform to a plurality of orthogonal components of motion for the naturally occurring low frequency background seismic data.

6. The method of claim 1 wherein decomposing seismic data further comprises smoothing the spectral component.

* * * * *